US012031453B1

(12) United States Patent
Kray et al.

(10) Patent No.: US 12,031,453 B1
(45) Date of Patent: Jul. 9, 2024

(54) COMPONENT WITH SPAR ASSEMBLY FOR A TURBINE ENGINE

(71) Applicant: GENERAL ELECTRIC COMPANY, Schenectady, NY (US)

(72) Inventors: Nicholas Joseph Kray, Mason, OH (US); Nitesh Jain, Bangalore (IN); Abhijeet Jayshingrao Yadav, Bangalore (IN); Balaraju Suresh, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/104,452

(22) Filed: Feb. 1, 2023

(30) Foreign Application Priority Data

Dec. 22, 2022 (IN) .............................. 202211074559

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2220/323* (2013.01); *F05D 2230/23* (2013.01); *F05D 2250/75* (2013.01); *F05D 2300/603* (2013.01)

(58) Field of Classification Search
CPC .... F01D 5/147; F01D 5/282; F05D 2220/323; F05D 2230/23; F05D 2250/75; F05D 2300/603
See application file for complete search history.

(56) References Cited

U.S. PATENT DOCUMENTS

| 3,734,642 A | 5/1973 | Dixon |
| 4,260,332 A | 4/1981 | Weingart et al. |
| 4,784,575 A | 11/1988 | Nelson et al. |
| 5,022,824 A | 6/1991 | Violette et al. |
| 5,634,771 A | 6/1997 | Howard et al. |
| 5,720,597 A | 2/1998 | Wang et al. |
| 8,070,450 B1 | 12/2011 | Ryznic et al. |

(Continued)

FOREIGN PATENT DOCUMENTS

| CA | 2893930 A1 | 6/2014 |
| EP | 1749971 A2 | 2/2007 |

(Continued)

OTHER PUBLICATIONS

Machine Translation of WO2022208002A1 PDF File Name: "WO2022208002A1_Machine_Translation.pdf".*

(Continued)

*Primary Examiner* — Grant Moubry
*Assistant Examiner* — Ruben Picon-Feliciano
(74) *Attorney, Agent, or Firm* — McGarry Bair PC

(57) ABSTRACT

A component and blade assembly for a turbine engine, the component having a wall bounding an interior and defining an exterior surface extending radially between a leading edge and a trailing edge to define a chordwise direction, and between a hub and a tip to define a spanwise direction. A metallic spar extending from the hub in the spanwise direction into the interior, the metallic spar defining a socket. A composite spar extending in the spanwise direction between a spar root and a spar tip, the spar root received in the socket. The component further having a stiffener.

20 Claims, 7 Drawing Sheets

(56) References Cited

U.S. PATENT DOCUMENTS

| | | |
|---|---|---|
| 8,292,583 B2 | 10/2012 | Marra |
| 9,429,024 B2 | 8/2016 | Nagle et al. |
| 9,777,579 B2 | 10/2017 | Kray et al. |
| 9,797,257 B2 | 10/2017 | Kray et al. |
| 2015/0252780 A1 | 9/2015 | Jonnalagadda |
| 2017/0355446 A1 | 12/2017 | Adrzejewski |
| 2018/0230826 A1* | 8/2018 | Vetters .................. F01D 11/008 |
| 2021/0131353 A1 | 5/2021 | O'Carroll et al. |

FOREIGN PATENT DOCUMENTS

| | | |
|---|---|---|
| FR | 2186380 | 1/1974 |
| FR | 3098544 A1 | 1/2021 |
| GB | 1427158 | 3/1976 |
| WO | WO-2022208002 A1 * | 10/2022 |

OTHER PUBLICATIONS

GE Aircaft Engines, "Full Scale Technology Demonstration of a Modern Counterrotating Unducted Fan Engine Concept, Design Report", NASA CR-180867, Dec. 1, 1987. Retrieved from the Internet: URL:https://ntrs.nasa.gov/api/citations/19900000732/downloads/19900000732.pdf [retrieved on Apr. 29, 2022] Section 8.3.5.1 (printed p. No. 174, doc p. No. 196, and following); figures 8-80, 8-81.

* cited by examiner

COMPONENT WITH SPAR ASSEMBLY FOR A TURBINE ENGINE

CROSS-REFERENCE TO RELATED APPLICATION(S)

This application claims priority to Indian Patent Application No. 202211074559, filed Dec. 22, 2022, which is incorporated herein by reference its entirety.

TECHNICAL FIELD

The disclosure generally relates to a component for a turbine engine, more specifically, to a blade assembly having a spar assembly.

BACKGROUND

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
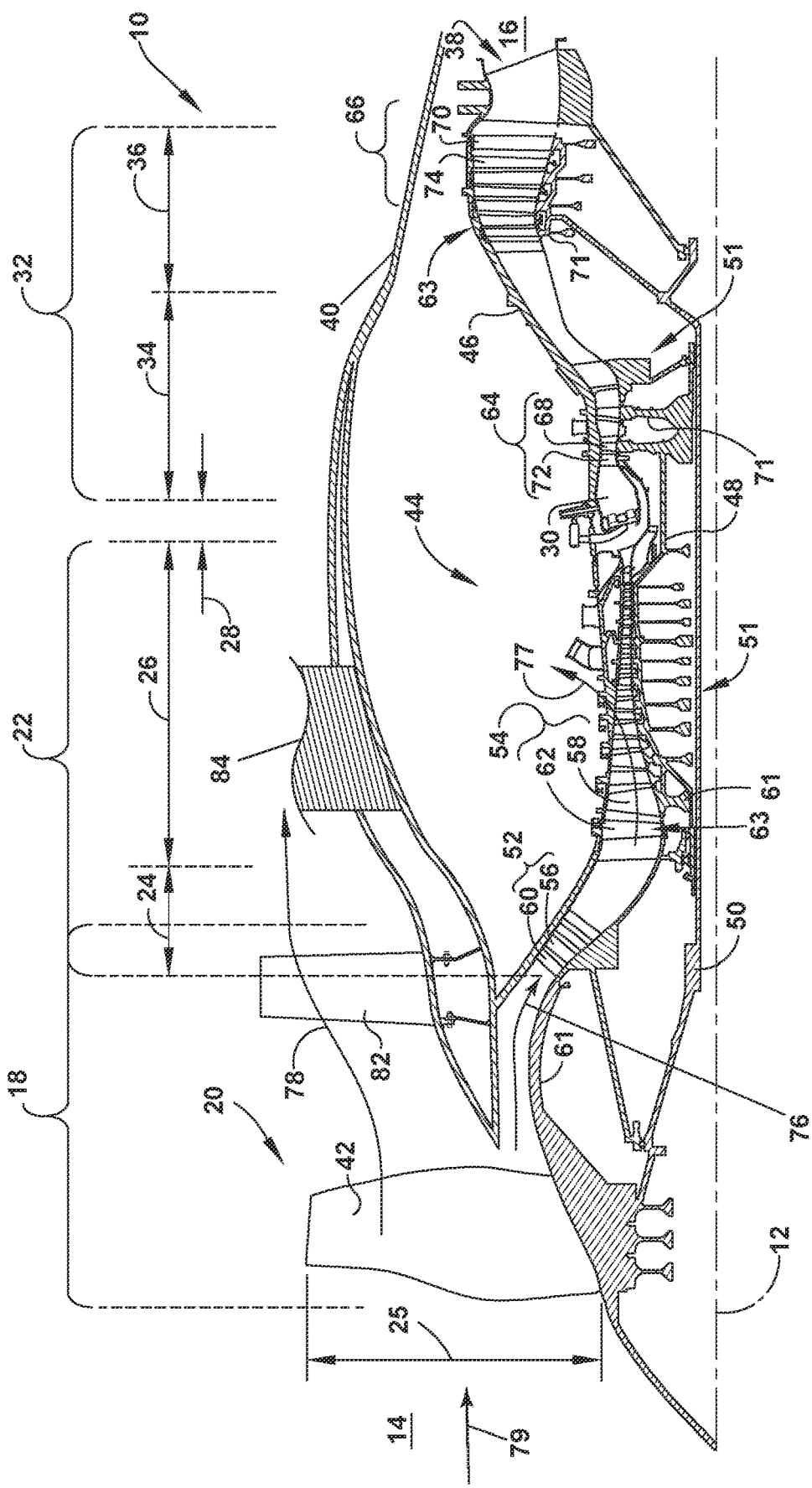
FIG. 1 is a schematic cross-sectional view of an unducted or open rotor turbine engine.

Traditionally, airfoils include a metallic spar that is formed with or coupled to a hub of an airfoil.

Aspects of the disclosure herein are directed to a component for a turbine engine having an airfoil with a metallic spar, a composite spar, and a stiffener together defining a spar assembly. The metallic spar can be shaped to receive a portion of the composite spar. The stiffener bonded to at least one of the airfoil, metallic spar, or the composite spar.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "composite," as used herein is, is indicative of a component having two or more materials. A composite can be a combination of at least two or more metal, non-metallic, or a combination of metal and non-metallic elements or materials. Examples of a composite material can be, but not limited to, a polymer matrix composite (PMC), a ceramic matrix composite (CMC), a metal matrix composite (MMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through the molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provides the strength of the system, the glass fibers can be incorporated to enhance the impact properties, which is a design characteristic for parts located near the inlet of the engine, and the thermoplastic fibers provide the binding for the reinforcement fibers.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3$ $2SiO_2$), as well as glassy aluminosilicates.

In certain non-limiting examples, the reinforcing fibers can be bundled and/or coated prior to inclusion within the ceramic matrix. For example, bundles of the fibers can be formed as a reinforced tape, such as a unidirectional reinforced tape. A plurality of the tapes can be laid up together to form a preform component. The bundles of fibers can be impregnated with a slurry composition prior to forming the preform or after formation of the preform. The preform can then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a gas turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, an unducted or open rotor turbine engine includes a set of circumferentially spaced fan blades, which extend, exteriorly, beyond a nacelle encasing an engine core.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

A HP shaft or spool 48 disposed coaxially about the engine centerline 12 of the unducted turbine engine 10 drivingly connects the HP turbine 34 to the HP compressor 26. A LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor refers to the combination of rotating elements throughout the unducted turbine engine 10.

Complementary to the rotor portion, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 79 flows against a forward portion of the unducted turbine engine 10. A portion of the freestream airflow 79 enters an annular area 25 defined by a swept area between an outer surface of the nacelle and the tip of the blade, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42 and over the nacelle 40 of the unducted turbine engine 10. Subsequently, the inlet airflow 78 flows over at least a portion of the set of stationary fan vanes 82, which directs the inlet airflow 78 such that it is transverse toward the engine centerline 12. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
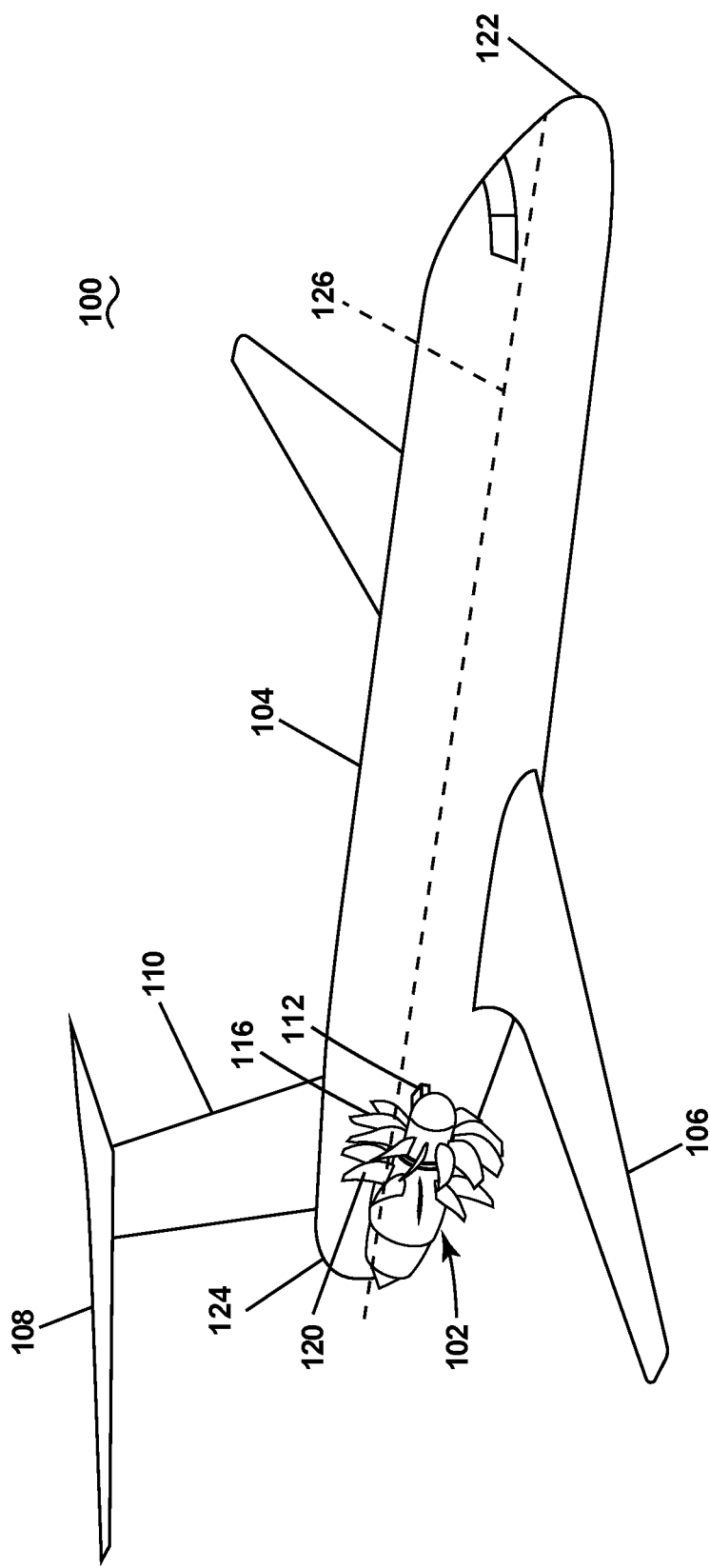
FIG. 2 is a schematic perspective view of an aircraft including the unducted or open rotor turbine engine of FIG. 1.

FIG. 2 is a schematic perspective view of an aircraft 100 including a generic unducted turbine engine 102 suitable for use as the unducted turbine engine 10 of FIG. 1. The aircraft 100 includes a fuselage 104 with an exterior surface. At least one wing 106 and a tail wing 108 extend from the fuselage 104. The tail wing 108 is operably coupled to and spaced from the fuselage 104 via a tail wing pylon 110. The unducted turbine engine 102 is operably coupled to the exterior surface of the fuselage 104 via a pylon 112. The unducted turbine engine 102 includes a set of circumferentially spaced fan blades 116. A set of stationary fan vanes 120 is provided downstream of the set of circumferentially spaced fan blades 116. The fuselage 104 extends between a nose 122 and a tail 124 and includes a fuselage centerline 126 extending therebetween.

Additionally, while the tail wing 108 is a T-wing tail wing (e.g., the tail wing 108 as illustrated), other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 108.

Figure 3:
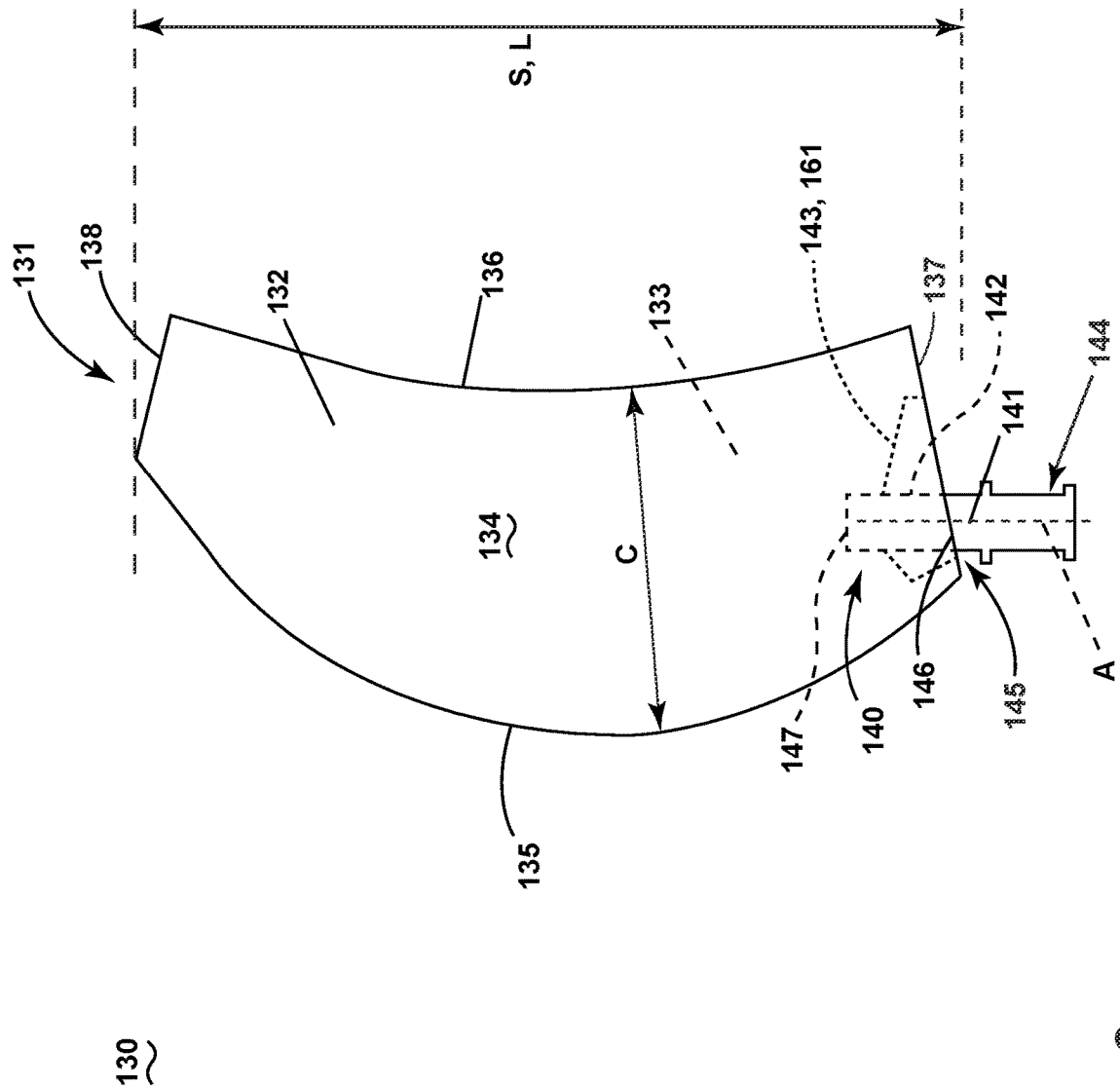
FIG. 3 is schematic illustration of an engine component in the form of a blade assembly with a spar assembly.

FIG. 3 is schematic illustration of an engine component in the form of, by way of non-limiting example, a blade assembly 130. The blade assembly 130 includes an airfoil 131 illustrated, by way of example, as a composite blade. The airfoil 131 can be, by way of non-limiting example, a blade of the set of fan blades 42, 116 or a blade from the compressor blades 56, 58 or the turbine blades 68, 70. Further, the engine component can be a vane assembly, where the airfoil 131 is a vane of the set of stationary fan vanes 82, 120, or a vane of the static vanes 60, 62, 72, 74. It is contemplated that the airfoil 131 can be a blade, vane, airfoil, or other component of any turbine engine, such as, but not limited to, a gas turbine engine, a turboprop engine, a turboshaft engine, or a turbofan engine.

The airfoil 131 includes a wall 132 bounding an interior 133. The wall 132 defines an exterior surface 134 extending radially between a leading edge 135 and a trailing edge 136 to define a chordwise direction (denoted "C"). The exterior surface 134 can further extend between a root 137 and a tip 138 to define a spanwise direction (denoted "S"). The wall 132 can be a composite wall made of one or more layers of material. The one or more layers of material can be applied during the same stage or different stages of the manufacturing of the airfoil 131.

By way of non-limiting example, wall 132 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The blade assembly 130 further includes a spar assembly 140. The spar assembly 140 including, but not limited to, a metallic spar 141, a composite spar 142, and a stiffener 143. The stiffener 143 can be formed from, at least in part, by a metal. It is further contemplated that the stiffener 143 is metallic. The stiffener 143 defines a wing portion 161 of the spar assembly 140. The spar assembly 140 defines an axis A extending radially from and perpendicular to the engine centerline 12 (FIG. 1). The airfoil 131 is mounted to the spar assembly 140 near the root 137 via a metallic trunnion 144 defining a hub 145. The airfoil 131 has a span length (denoted "L") measured along the spanwise direction S from the hub 145 at 0% the span length L to the tip 138 at 100% the span length L. The span length L can run parallel to the axis A and be defined as the maximum distance between the root 137 and the tip 138 of the airfoil 131. An entirety of the spar assembly 140 can be located below 20% of the span length L. The wall 132 can circumscribe and/or surround at least a portion of the spar assembly 140. At least a portion of the spar assembly 140 can be bonded to the wall 132.

The metallic spar 141 can be formed from metals such as, but not limited to, titanium, iron, aluminum, stainless steel and nickel alloys. At least a portion of the metallic spar 141 can be located within the interior 133. The metallic spar 141 can be integral with the metallic trunnion 144. The metallic spar 141 can be located above the hub 145 and within the interior 133. Remaining portions of the metallic trunnion 144 can be located below the airfoil 131.

The composite spar 142 can be formed from a polymeric material or other non-metal materials. At least a portion of the composite spar 142 can be located within the interior 133. The composite spar 142 can extend in the spanwise direction S between a spar root 146 and a spar tip 147. A majority of the composite spar 142 including the spar tip 147 can be located within the interior 133.

The stiffener 143 can be formed from metals such as, but not limited to, titanium, iron, aluminum, stainless steel, and nickel alloys. In one aspect, the stiffener 143 can be located within the interior 133. In another aspect the stiffener 143 can be located on the exterior surface 134 of the wall 132. It is further contemplated that a portion of the stiffener 143 can be located within the interior 133 while other portions are located on the exterior surface 134 of the wall 132.

It is also contemplated that one or more layers of adhesive (not shown) can be applied between the wall 132 and any portion of the spar assembly 140. Further, it is contemplated that the adhesive can be absorbed by the wall 132, and/or one or more portions of the spar assembly 140. The adhesive can include resin and phenolics, wherein the adhesive can require curing at elevated temperatures or other hardening technique. It should be understood that any part of the spar assembly 140 can be located in the interior 133 and/or on the exterior surface 134 and bonded at those positions accordingly.

Figure 4:
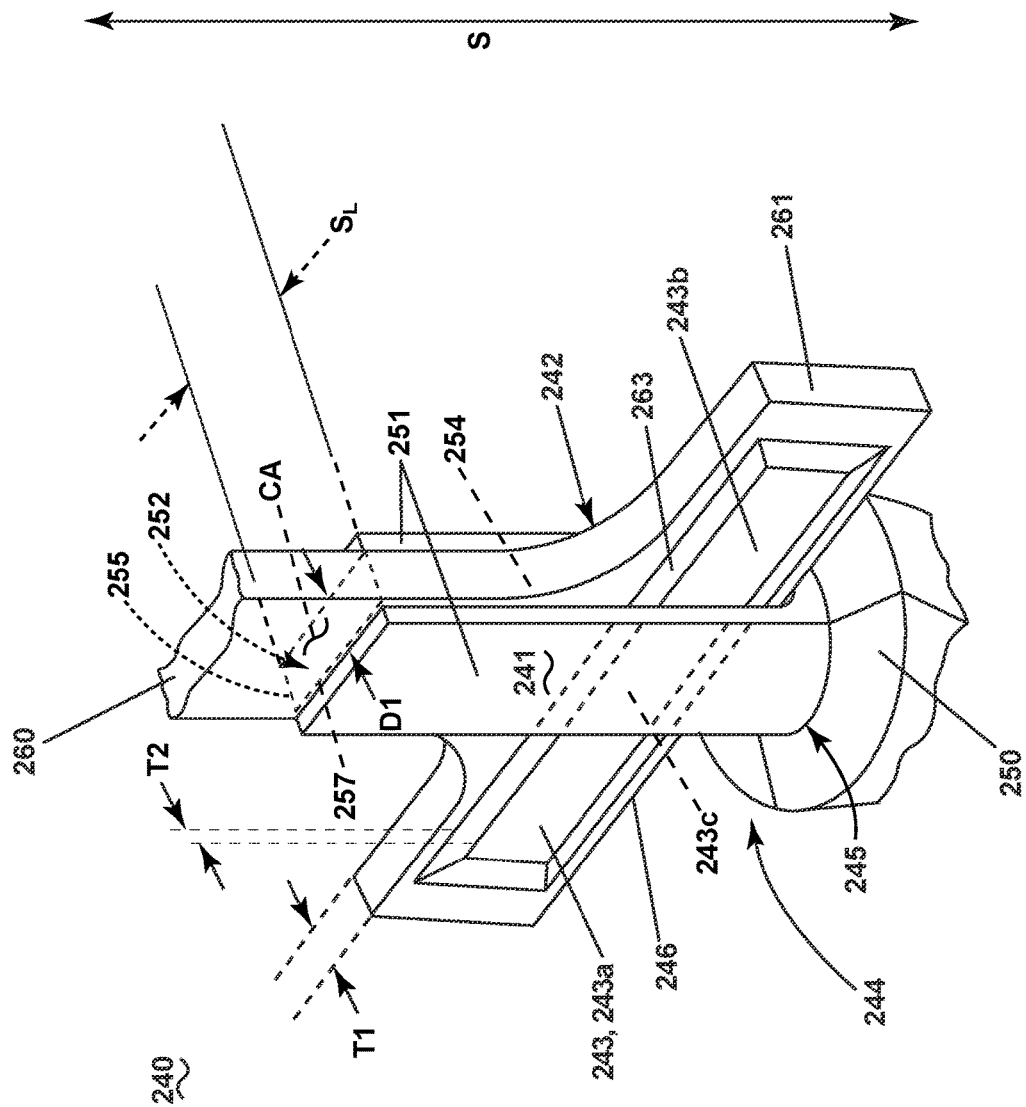
FIG. 4 is a perspective view of a variation of the spar assembly from FIG. 3 according to an aspect of the disclosure herein.

Turning to FIG. 4, a perspective view of a spar assembly 240 according to an aspect of the disclosure herein is illustrated. The spar assembly 240 is similar to the spar assembly 140, therefore, like parts of the spar assembly 240 will be identified with like numerals increased by 100, with it being understood that the description of the like parts of the spar assembly 140 applies to the spar assembly 240, except where noted.

A metallic spar 241 can extend from a base 250 of a metallic trunnion 244 to define a hub 245 of the spar assembly 240. The metallic spar 241 includes a set of walls 251, each wall of the set of walls 251 defining an interior surface spaced from each other a first distance (denoted "D1"), to define a socket 252 illustrated in dashed line. The socket 252 is closed by the set of walls 251 on at least two sides 257. The socket 252 is open on another two opposing sides 255 to define side openings 254. The socket 252 can have a socket length $S_L$ where the socket 252 has a cross-sectional area (denoted "CA") equal to the socket length $S_L$ multiplied by the first distance D1 (CA=$S_L$×D1). The cross-sectional area CA can range between 1.0 in² and 15 in² (6.4516 cm² and 96.774 cm²)

A composite spar 242 is received in the socket 252. The composite spar 242 can have a first thickness (denoted "T1") that is less than the first distance D1. It is further contemplated that the first thickness T1 is almost equal to the first distance D1 to provide a snug fit of the composite spar 242 in the socket 252. The composite spar 242 can include a body portion 260 and a wing portion 261. The wing portion 261 and the body portion 260 forming an upside down "T" shape. The body portion 260 can extend in the spanwise direction S within the socket 252 from a spar root 246. The wing portion 261 can extend in a direction substantially perpendicular to the spanwise direction S from the body portion 260 out of the side openings 254.

A stiffener 243 is bonded with at least a portion of the composite spar 242. The stiffener 243 can be bonded to an outer surface of the wing portion 262 on one or both sides of the composite spar 242. In one non-limiting example the stiffener 243 is bonded to the wing portion 261 of the composite spar 242. A single stiffener 243c can extend along the composite spar 242 through the socket 252 and overlap with the metallic spar 241. It is further contemplated that the stiffener 243 can be multiple parts 243a, 243b located on the wing portion 261 outside of the socket 252. In this example the stiffener 243 does not extend through the socket 252 or overlap with the metallic spar 241. The stiffener 243 can have a second thickness (denoted "T2"). Further, the stiffener 243 includes at least one tapered edge 263 that tapers from the second thickness T2 toward the composite spar 242. In one non-limiting example the stiffener 243 has all tapered edges 263. In the aspect where the stiffener is a single stiffener 243c, the first thickness T1 and the second thickness T2 together are almost equal to the first distance D1 (D1≈T1+T2) to provide the snug fit previously described herein. While illustrated as having uniform thicknesses T1, T2, it is contemplated that the thicknesses as described herein can change.

In one aspect, one or more layers of adhesive (not shown) can be applied between the stiffener 243 and the wing portion 261 of the composite spar 242. Additionally, or alternatively, one or more layers of adhesive (not shown) can be applied between the metallic spar 241 and the stiffener 243 or the composite spar 242, or between both the metallic spar 241 and the stiffener 243 and the composite spar 242.

Figure 5:
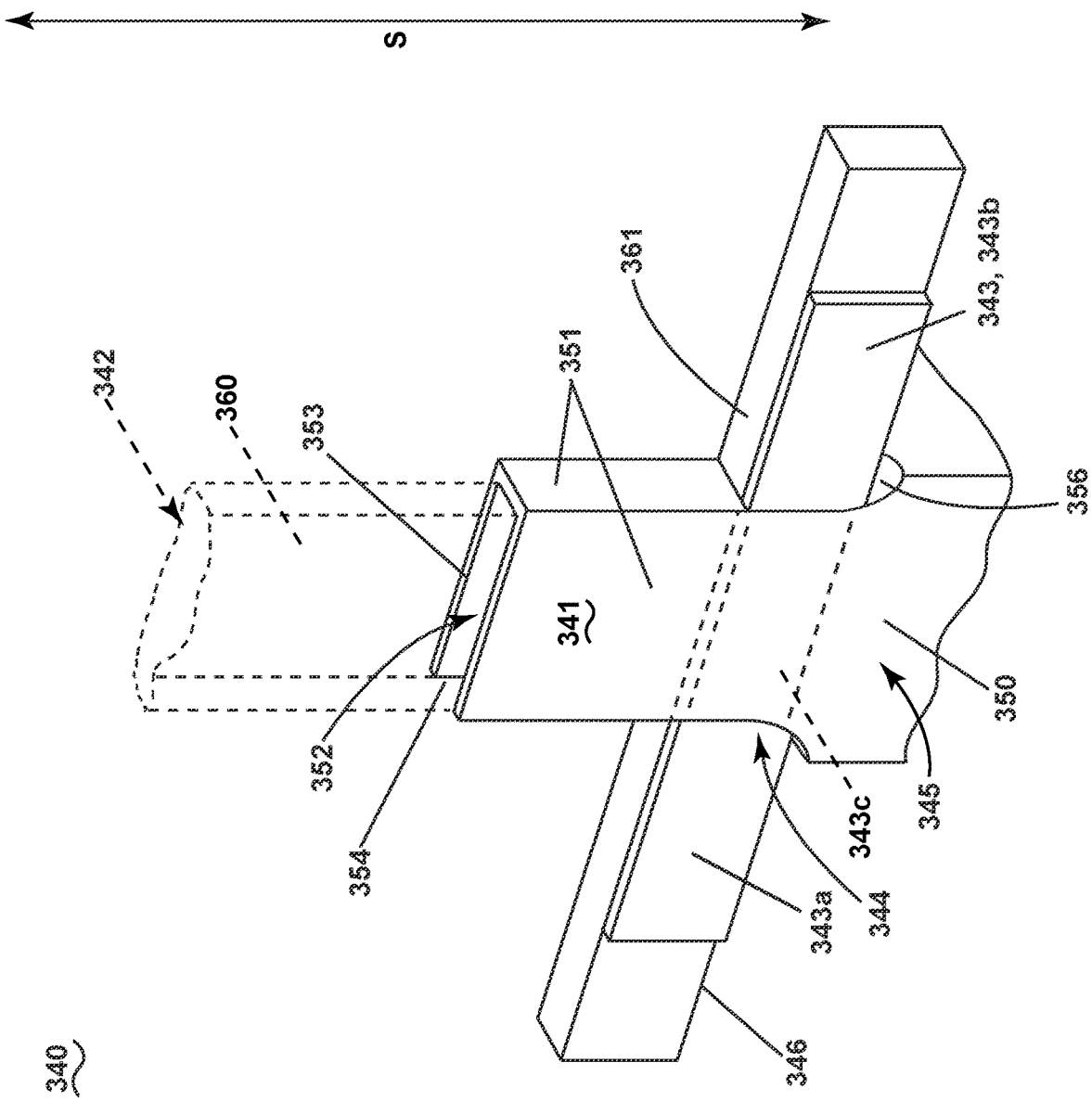
FIG. 5 is a perspective view of another variation of the spar assembly from FIG. 3 according to another aspect of the disclosure herein.

Turning to FIG. 5, a spar assembly 340 according to another aspect of the disclosure herein is illustrated. The spar assembly 340 is similar to the spar assembly 240, therefore, like parts of the spar assembly 340 will be identified with like numerals increased by 100, with it being understood that the description of the like parts of the spar assembly 240 applies to the spar assembly 340, except where noted.

A metallic spar 341 can extend from a base 350 of a metallic trunnion 344 to define a hub 345 of the spar assembly 340. The metallic spar 341 can include a set of walls 351 spaced from each other to define a socket 352. The socket 352 is closed on three sides, defined by the set of walls 351. The socket 352 is open on a remaining side to define a side opening 354. In other words, the socket 352 has a sideways "U" shape 353. A thru hole 356 is located opposite the side opening 354 in the set of walls 351 at the hub 345. At least a portion of the thru hole 356 is formed in the base 350.

A composite spar 342 is received in the socket 352. The composite spar 342 includes a body portion 360 (illustrated in dashed line) and a wing portion 361 (illustrated in solid line). The wing portion 361 and the body portion 360 forming an upside down "T" shape. The body portion 360 can extend in the spanwise direction S within the socket 352 from a spar root 346. The wing portion 361 can extend in a direction substantially perpendicular to the spanwise direction S from the body portion 360 out of the side opening 354 on one side and out of the thru hole 356 on the other side of the body portion 360.

A stiffener 343 is bonded with at least a portion of the composite spar 342. The stiffener 343 can be bonded to an outer surface of the wing portion 262 on one or both sides of the composite spar 342. In one non-limiting example the stiffener 343 is bonded to the wing portion 361 of the composite spar 342. A single stiffener 343c can extend along the composite spar 342 through the socket 352 and overlap with the metallic spar 341. It is further contemplated that the stiffener 343 can be multiple parts 343a, 343b located on the wing portion 361 outside of the socket 352.

Figure 6:
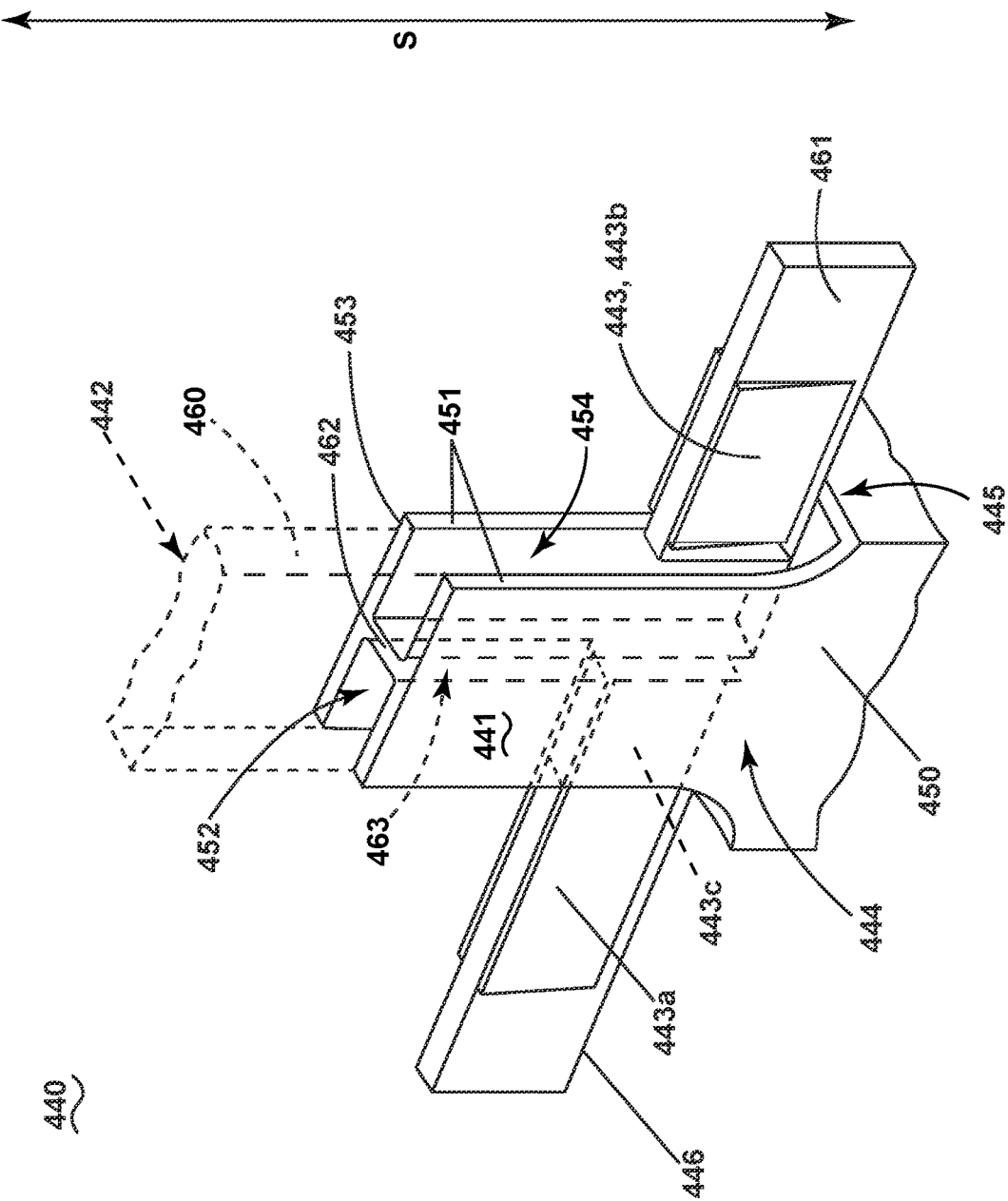
FIG. 6 is a perspective view of yet another variation of the spar assembly from FIG. 3 according to yet another aspect of the disclosure herein.

Turning to FIG. 6, a spar assembly 440 according to another aspect of the disclosure herein is illustrated. The spar assembly 440 is similar to the spar assembly 340, therefore, like parts of the spar assembly 440 will be identified with like numerals increased by 100, with it being understood that the description of the like parts of the spar assembly 340 applies to the spar assembly 440, except where noted.

A metallic spar 441 can extend from a base 450 of a metallic trunnion 444 to define a hub 445 of the spar assembly 440. The metallic spar 441 includes a set of walls 451 spaced from each other to define a socket 452. The metallic spar 441 includes a middle truss 462 separating the socket 452 into two openings 454. In other words, the socket 452 has a sideways "H" shape 453. While illustrated as in the middle, the middle truss 462 can be located nearer to either opening 454 and does not necessarily have to be located directly in the middle.

A composite spar 442 is received in the socket 452. The composite spar 442 includes a body portion 460 (illustrated in dashed line) and a wing portion 461 (illustrated in solid line). The wing portion 461 and the body portion 460 forming an upside down split "T" shape, where a slot 463 is formed in the composite spar 442 to accommodate the middle truss 462 when assembled. The body portion 460 can extend in the spanwise direction S within the socket 452 from a spar root 446. The wing portion 461 can extend in a direction substantially perpendicular to the spanwise direction S from the body portion 460 out of the openings 454.

At least one stiffener 443 is bonded with at least a portion of the composite spar 442. In one non-limiting example the stiffener 343 is bonded to the wing portion 461 of the composite spar 442 on both sides as illustrated. The at least one stiffener 443 can also be multiple parts 443a, 443b located on the wing portion 461 outside of the socket 452. It is further contemplated that the at least one stiffener 443 is an extended stiffener 443c extending at least partially into the socket 452.

Figure 7:
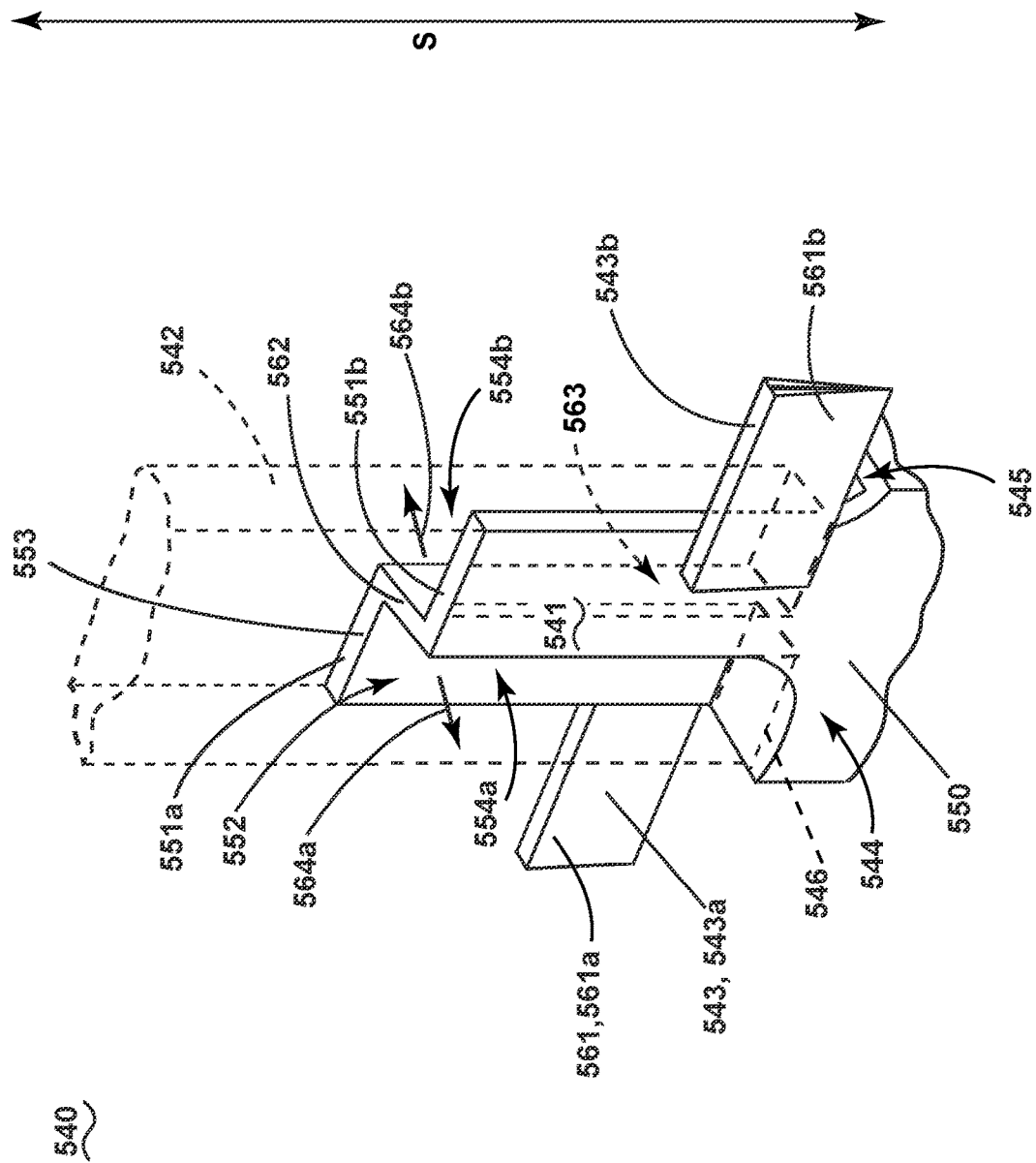
FIG. 7 is a perspective view of another variation of the spar assembly from FIG. 3 according to another aspect of the disclosure herein.

Turning to FIG. 7, a spar assembly 540 according to another aspect of the disclosure herein is illustrated. The spar assembly 540 is similar to the spar assembly 440, therefore, like parts of the spar assembly 540 will be identified with like numerals increased by 100, with it being understood that the description of the like parts of the spar assembly 440 applies to the spar assembly 540, except where noted.

A metallic spar 541 can extend from a base 550 of a metallic trunnion 544 to define a hub 545 of the spar assembly 540. The metallic spar 541 includes a first wall 551a and a second wall 551b connected by a middle truss 562 separating a first opening 554a from a second opening 554b. While illustrated as in the middle, the middle truss 562 can be located nearer to either opening 554a, 554b and does not necessarily have to be located directly in the middle. Together the first opening 554a and the second opening 554b defines a socket 552. The first opening 554a is defined by the first wall 551a and the middle truss 562 and opens in a first direction 564a. The second opening 554b is defined by the second wall 551b and the middle truss 562 and opens in a second direction 564b opposite the first direction 564a. In other words, the socket 552 has a lightning bolt or sideways "Z" shape 553.

A composite spar 542 is received in the socket 552. The composite spar 542 includes a slot 563 formed to accommodate the middle truss 562 when assembled. The composite spar 542 can extend in the spanwise direction S within the socket 552 from a spar root 546.

At least one stiffener 543 is bonded with at least a portion of the metallic spar 541. In one non-limiting example the at least one stiffener 543 is bonded to the metallic spar 541 to define a wing portion 561. The at least one stiffener 543 can be multiple stiffeners 543a, 543b each defining separate wing portions 561a, 561b.

The disclosure herein applies to bonding metallic metal pieces to a composite spar/metallic trunnion interface to help disperse load transfer and provide chordwise stiffness. Benefits to the disclosure include dispersing the load transfer while being versatile in location. These bonded metallic pieces can be either internal to the spar/trunnion interface or external to the interface region. Additionally, a benefit is to reduce high composite spar stresses that are induced from chordwise bending that occurs during extreme loading conditions.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A component for a turbine engine, the component comprising a wall bounding an interior and defining an exterior surface extending radially between a leading edge and a trailing edge to define a chordwise direction, and between a root and a tip to define a spanwise direction; and a spar assembly comprising a metallic spar extending from a hub in the spanwise direction into the interior, the metallic spar defining a socket; a composite spar extending in the spanwise direction between a spar root and a spar tip, at least a portion of the spar root located in the socket; and a stiffener bonded to at least one of the wall, the metallic spar, or the composite spar.

The component of any preceding clause wherein the wall defines an airfoil having a span length measured from the root to the tip, the root defining 0% of the span length and the tip defining 100% of the span length and wherein the stiffener is located below 20% of the span length.

The component of any preceding clause further comprising a trunnion defining the hub and including the metallic spar.

The component of any preceding clause further comprising a wing portion extending in a direction perpendicular to the spanwise direction at the hub.

The component of any preceding clause wherein the stiffener defines the wing portion.

The component of any preceding clause wherein the composite spar defines the wing portion.

The component of any preceding clause wherein the stiffener is bonded to the wing portion.

The component of any preceding clause wherein the stiffener is multiple parts.

The component of any preceding clause wherein the stiffener overlaps with the metallic spar.

The component of any preceding clause wherein the stiffener is bonded to the exterior surface of the wall.

The component of any preceding clause wherein the stiffener includes at least one tapered edge.

The component of any preceding clause wherein the socket has an H shape.

The component of any preceding clause wherein the socket has a Z shape.

The component of any preceding clause wherein the socket has a U shape.

The component of any preceding clause wherein the component is a blade assembly.

A blade assembly for a turbine engine, the blade assembly comprising a composite wall bounding an interior and having an exterior surface, the composite wall defining a blade extending radially between a leading edge and a trailing edge to define a chordwise direction, and between a root and a tip to define a spanwise direction; a spar assembly comprising a trunnion defining a hub and having a set of walls defining a socket, a composite spar extending in the spanwise direction between a spar root and a spar tip, the spar root located in the socket, a stiffener bonded to at least one of the composite wall, the trunnion, or the composite spar, and a wing portion defined at least in part by the stiffener.

The blade assembly of any preceding clause wherein the composite wall has a span length measured from the root to the tip, the root defining 0% of the span length and the tip defining 100% of the span length and wherein the stiffener is located below 20% of the span length.

The blade assembly of any preceding clause wherein the stiffener is bonded to the composite spar to define the wing portion.

The blade assembly of any preceding clause wherein the stiffener overlaps with the trunnion.

The blade assembly of any preceding clause wherein the stiffener is bonded to the exterior surface of the composite wall.

What we claim is:

1. A component for a turbine engine, the component comprising:
   a wall bounding an interior and defining an exterior surface extending radially between a leading edge and a trailing edge to define a chordwise direction, and between a root and a tip to define a spanwise direction; and
   a spar assembly comprising:
      a metallic spar extending from a hub in the spanwise direction into the interior, the metallic spar defining a socket having at least one side opening;
      a composite spar different than the metallic spar, the composite spar extending in the spanwise direction between a spar root and a spar tip, at least a portion of the spar root located in the socket; and
      a stiffener bonded to at least one of the wall, the metallic spar, or the composite spar, at least a portion of the stiffener extending at least in part through the at least one side opening.

2. The component of claim 1 wherein the wall defines an airfoil having a span length measured from the root to the tip, the root defining 0% of the span length and the tip defining 100% of the span length and wherein the stiffener is located below 20% of the span length.

3. The component of claim 1 further comprising a trunnion defining the hub and including the metallic spar.

4. The component of claim 1 further comprising a wing portion extending in a direction perpendicular to the spanwise direction at the hub.

5. The component of claim 4 wherein the stiffener defines the wing portion.

6. The component of claim 4 wherein the composite spar defines the wing portion.

7. The component of claim 6 wherein the stiffener is bonded to the wing portion.

8. The component of claim 1 wherein the stiffener is multiple parts.

9. The component of claim 1 wherein the stiffener overlaps with the metallic spar.

10. The component of claim 1 wherein the stiffener is bonded to the exterior surface of the wall.

11. The component of claim 1 wherein the stiffener includes at least one tapered edge.

12. The component of claim 1 wherein the socket has an H shape.

13. The component of claim 1 wherein the socket has a Z shape.

14. The component of claim 1 wherein the socket has a U shape.

15. The component of claim 1 wherein the component is a blade assembly.

16. A blade assembly for a turbine engine, the blade assembly comprising:
   a composite wall bounding an interior and having an exterior surface, the composite wall defining a blade extending radially between a leading edge and a trailing edge to define a chordwise direction, and between a root and a tip to define a spanwise direction;
   a spar assembly comprising:
      a trunnion defining a hub and having a set of walls defining a socket having at least one side opening,
      a composite spar extending in the spanwise direction between a spar root and a spar tip, the spar root located in the socket,
      a stiffener bonded to at least one of the composite wall, the trunnion, or the composite spar, and
      a wing portion extending at least in part through the at least one side opening and defined at least in part by the stiffener.

17. The blade assembly of claim 16 wherein the composite wall has a span length measured from the root to the tip, the root defining 0% of the span length and the tip defining 100% of the span length and wherein the stiffener is located below 20% of the span length.

18. The blade assembly of claim 16 wherein the stiffener is bonded to the composite spar to define the wing portion.

19. The blade assembly of claim 16 wherein the stiffener overlaps with the trunnion.

20. The blade assembly of claim 16 wherein the stiffener is bonded to the exterior surface of the composite wall.

* * * * *